United States Patent [19]

Lichy

[11] Patent Number: 5,351,742
[45] Date of Patent: * Oct. 4, 1994

[54] CLOSURE ASSEMBLY FOR STRUCTURAL MEMBERS

[76] Inventor: Dale Lichy, 4651 Sylvan Dr., Allison Park, Pa. 15101

[*] Notice: The portion of the term of this patent subsequent to Jul. 21, 2009 has been disclaimed.

[21] Appl. No.: 919,035

[22] Filed: Jul. 24, 1992

Related U.S. Application Data

[60] Continuation-in-part of Ser. No. 729,696, Jul. 15, 1991, Pat. No. 5,163,495, which is a division of Ser. No. 535,101, Jun. 8, 1990, Pat. No. 5,131,450.

[51] Int. Cl.⁵ .................................................. E06B 9/56
[52] U.S. Cl. .................................... 160/273.1; 160/310
[58] Field of Search ............... 160/310, 273.1, 271, 160/272, 378, 269, 268.1; 296/100, 101

[56] References Cited

U.S. PATENT DOCUMENTS

| | | |
|---|---|---|
| 550,412 | 11/1895 | Harris . |
| 618,831 | 2/1899 | Barr . |
| 1,387,452 | 8/1921 | Chapin . |
| 1,425,484 | 8/1922 | Jenkins . |
| 1,673,326 | 6/1928 | Goldsmith . |
| 1,892,001 | 12/1932 | Nye . |
| 1,961,383 | 6/1934 | Nye et al. ................. 156/14 |
| 2,584,014 | 1/1952 | Harper ..................... 296/137 |
| 2,594,910 | 4/1952 | Germann .................. 296/93 |
| 2,886,103 | 5/1959 | Pitcoff ....................... 160/269 |
| 4,649,981 | 3/1987 | Bibeau ....................... 160/120 |
| 4,766,941 | 8/1988 | Sloop et al. ................ 160/241 |
| 4,825,921 | 5/1989 | Rigter ........................ 160/23.1 |
| 5,131,450 | 7/1992 | Lichy .................... 160/273.1 X |
| 5,163,495 | 6/1992 | Lichy ........................ 160/273.1 |

*Primary Examiner*—Blair M. Johnson
*Attorney, Agent, or Firm*—Arnold B. Silverman

[57] ABSTRACT

A closure assembly which is adapted to be used with structural members has a pair of guides and a closure member which is in mechanical interengagement with the guides so as to permit relative sliding movement in opening and closing the closure. The closure member has a pair of tracking members disposed on opposite edges which may take the form of tape members. These tracking means are retained within the guides.

The guides may have secured thereto shoes which are engaged within guide channels secured to frame members so that relative lateral movement between the guides and frames is permitted. A biasing assembly which enhances lateral tension on the closure member may be employed.

20 Claims, 10 Drawing Sheets

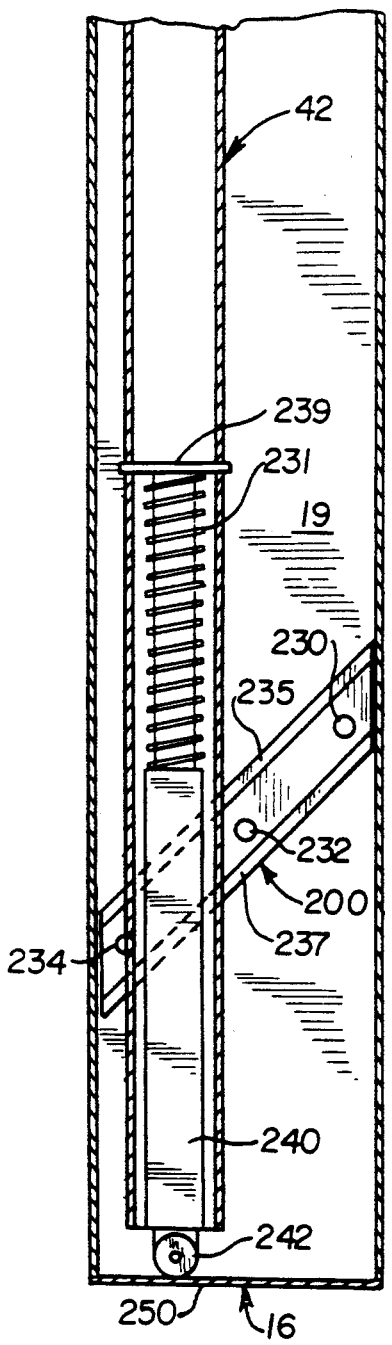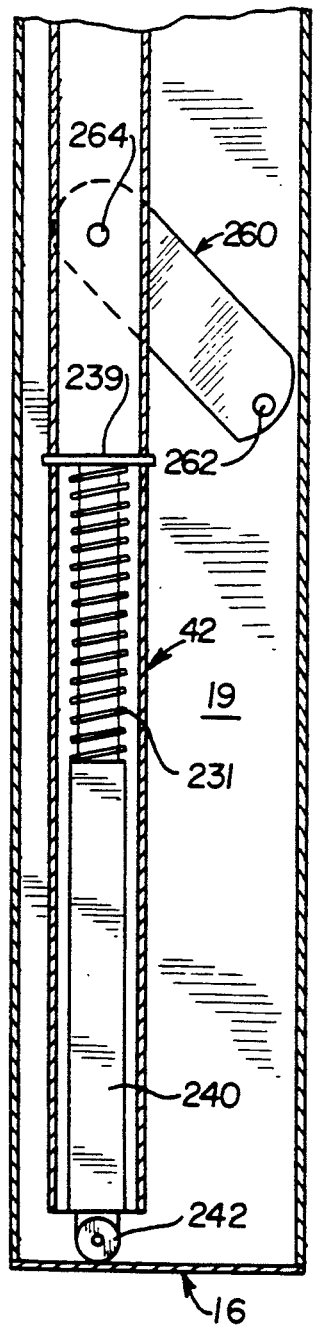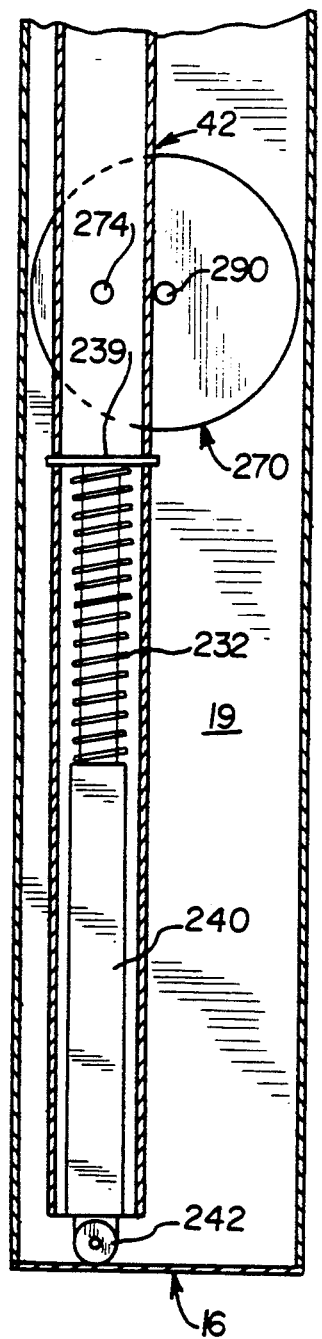

CLOSURE ASSEMBLY FOR STRUCTURAL MEMBERS

CROSS REFERENCE TO RELATED APPLICATION

This application is a continuation-in-part of U.S. application Ser. No. 07/729,696, filed Jul. 15, 1991, U.S. Pat. No. 5,163,495, entitled "CLOSURE FOR STRUCTURAL MEMBERS" which was a divisional of U.S. application Ser. No. 07/535,101, Filed Jun. 8, 1990, entitled "CLOSURE ASSEMBLY FOR STRUCTURAL MEMBERS" now U.S. Pat. No. 5,131,450.

BACKGROUND OF THE INVENTION

1. Field of the Invention

The present invention relates to closure means for structural members such as doors, windows, truck beds and the like and, more specifically, it relates to such an assembly which is easy to install and may sustain impact loads with minimum structural damage.

2. Description of the Prior Art

It has been known for numerous structural usages to provide various forms of movable closures such as doors and windows, for example, including those which may be subjected to frequent use and abuse as in an industrial or commercial environment.

It has also been known to provide such doors with closure members made of flexible materials which may be received on and released from a motorized reel so as to open and close the doors. One of the problems with industrial doors of this type is that they are frequently subjected to undesired high impact loads which do structural damage to the door, the door frames, or both.

U.S. Pat. No. 550,412 discloses a means for clamping and unclamping screen material between framing members by employing pins which slide in angularly disposed slots moving in a plane generally perpendicular to the plane of the screen material U.S. Pat. No. 1,961,383 discloses window screens having pins moving in angularly disposed slots which serve as stop members.

A clamping mechanism for a window screen disclosed in U.S. Pat. No. 1,892,001.

U.S. Pat. No. 2,886,103 discloses a retractable system for windows wherein a cam slot serves to provide clamping once the closure is in place.

U.S. Pat. No. 2,594,910 discloses a roll-up type cover for trucks and trailers. U.S. Pat. No. 2,584,014 discloses a removable truck top.

U.S. Pat. No. 4,825,921 discloses a roll-up material, such as a screen, which has either formed within or secured to its edges supporting elements which are said to be composed of relatively thin material. These elements are engaged in guide rails. It also discloses the use of intermediate reinforcing members disposed within the web. In the preferred form, the supporting elements are of concave shape.

U.S. Pat. No. 4,766,941 discloses the use of a motor in operating a roller shade.

U.S. Pat. No. 4,649,981 discloses fabric having a plurality of flaps which hold the margins in the desired position.

A window screen having projecting tabs which are adapted to move in a slot is disclosed in U.S. Pat. No. 618,831. U.S. Pat. No. 1,425,484 also discloses a screen member having portions which ride in a track.

U.S. Pat. No. 1,673,326 discloses a spring biased tensioning mount for applying tension to a screen.

U.S. Pat. No. 1,387,452 discloses a window screen having a roller cam which may be rotated by means of an operating handle in order to cam the screen fabric against the track wall.

U.S. Pat. No. 4,825,921 discloses a roll-up material, such as a screen which has either formed within or secured to its edges supporting element which are said to be composed of relatively thin resilient material and are engaged in guide rails.

In spite of these previously known systems, there remains a need for an improved closure system for structural members which will resist undesired damage, provide effective sealing, and function in an efficient manner under a wide variety of operating conditions.

SUMMARY OF THE INVENTION

The closure assembly of the present invention has met the above-described need.

In one embodiment a closure member has tracking means secured thereto with the tracking means being mechanically secured within guide means for relative sliding movement therebetween.

Biasing means are preferably employed in order to provide lateral tension on the closure member. The biasing means may include a coil spring which urges shoe means angularly outwardly. The shoe means are disposed within a plurality of generally upwardly and angularly disposed channel guides.

It is an object of the present invention to provide an improved closure assembly which is adapted for use in a wide variety of structural applications and is adapted to function efficiently while resisting deleterious effects of impact loads.

It is a another object of the present invention to provide a closure member slidingly interengaged with guide means and such guide means being movably secured to associated frame means.

It is a further object of the present invention to provide a durable construction of this type which may be used on garage doors, industrial doors, other types of doors, windows, truck bed closures, swimming pool covers, and awnings.

It is a further object of this invention to provide a closure assembly which seals separated regions to resist environmental contamination.

It is a further object of the present invention to provide such a closure which establishes an effective seal between areas on opposite sides of the closure assembly.

It is another object of the present invention to provide such a closure assembly which reduces friction and thereby facilitates ease of use and minimizes material wear.

It is another object of this invention to provide such a closure assembly which permits expansion and contraction of the closure, as well as adjusting for out of plumb installation of the guide system and maintains the desired tension in the closure material.

It is yet another object of the present invention to provide such a door wherein positive means are employed to facilitate transverse tensioning of the closure member.

It is another object of the present invention to provide such a closure assembly which is adapted for use with power operated closure members.

These and other objects of the invention will be more fully understood from the following description of the

BRIEF DESCRIPTION OF THE DRAWINGS

FIG. 8 is a partial exploded view showing portions of the guide means of FIG. 27.

FIG. 9 is a cross-sectional illustration of one form of biasing means employable in the present invention.

FIG. 10 is a cross-sectional illustration of another form of biasing means employable in the present invention.

FIG. 11 is a cross-sectional view of another form of biasing means employable in the present invention.

DESCRIPTION OF THE PREFERRED EMBODIMENTS

Figure 1:
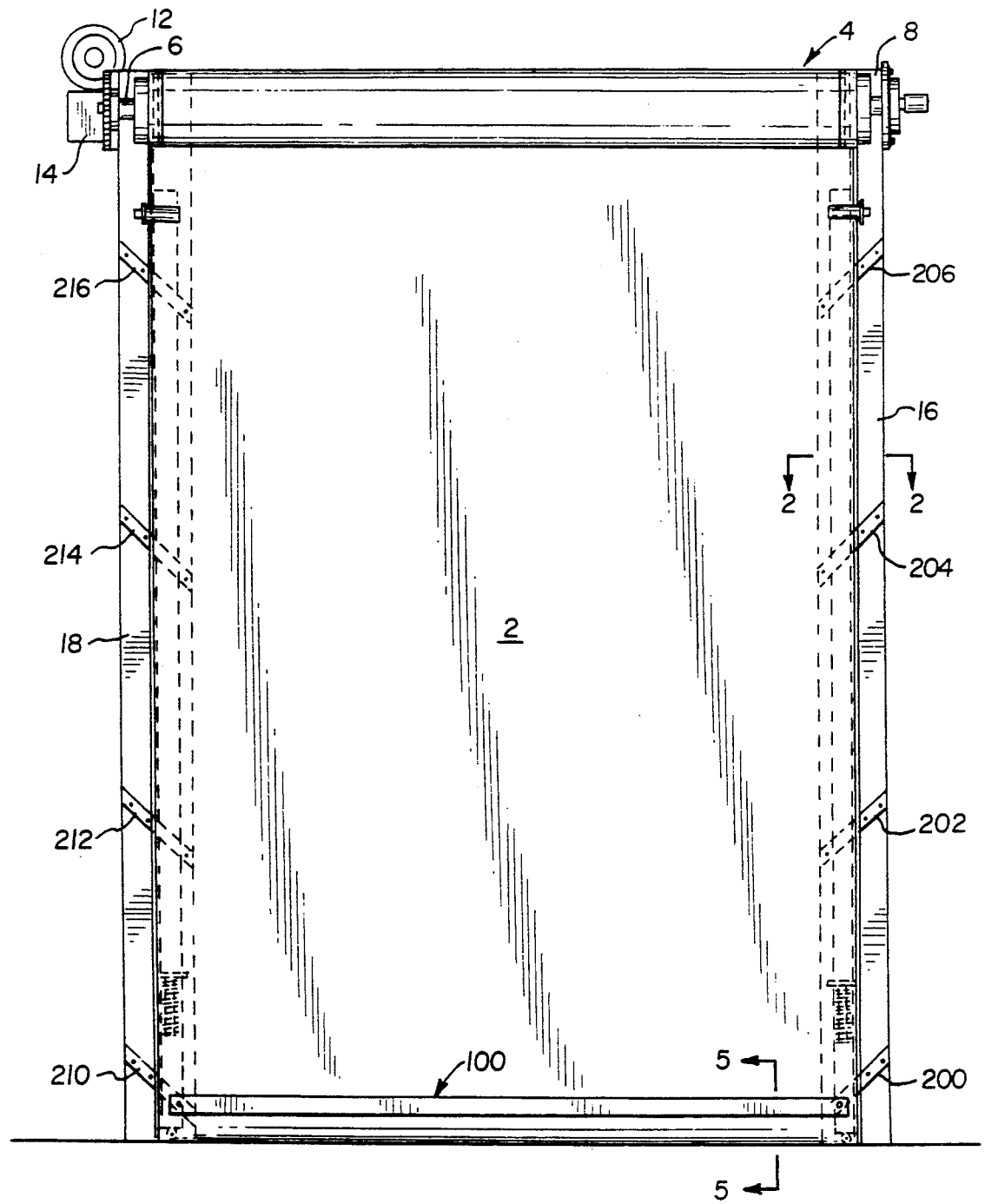
FIG. 1 is a front elevational view of a garage or industrial door of the present invention.

As used herein the term "closure member" shall be deemed to include closures in the form of various types of members which are adapted to close and open structural openings such as doors, windows, pickup truck beds, swimming pools and the like.

Referring once again to FIG. 1, there is shown a closure member 2, which in the form illustrated, is a door made out of a flexible material such as vinyl coated polyester core fabric or polyvinyl chloride, for example, which is adapted to be stored on reel 4 when the door is in the open position. The reel 4 is fixedly secured to shafts 6, 8 which are journaled in suitable bearings (not shown). The reel 4 is adapted to be driven in one of two directions depending upon whether the door is being opened or closed by reversible motor 12 through gear box 14. In the alternative, the reel 4 may be driven by hand chain, push-pull means or a crank, for example. A spring may be inserted inside or outside of the barrel to assist in operation of the closure for these alternative methods. In the form illustrated, the door is in the down or closed position. The door has a pair of generally vertically oriented frame members 16, 18 which are generally parallel to each other and disposed adjacent to the lateral edges of the closure member 2.

Figure 2:
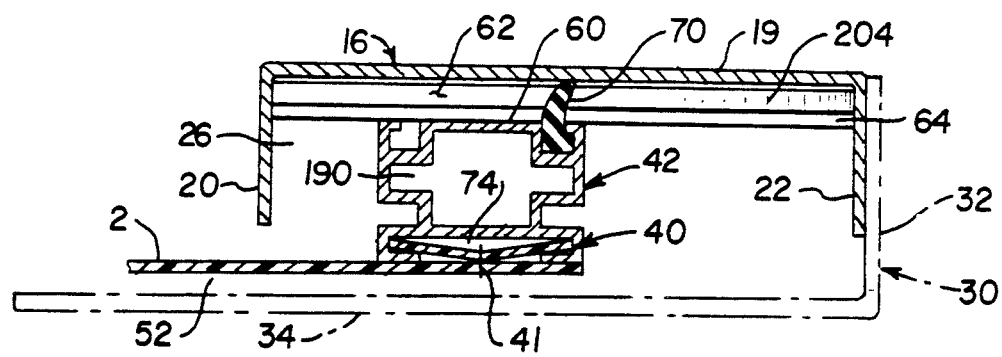
FIG. 2 is a cross-sectional illustration of a portion of the closure member securing means taken through 2—2 of FIG. 1.

Referring to FIGS. 1 and 2, it will be noted that the frame 16 has a rear portion 19 and a pair of forwardly projecting flanges 20, 22 which are oriented generally perpendicularly with respect thereto and create a channel which defines a recess 26. Lower flange 64 is at the lower end of frame 16. While not illustrated in FIG. 1, the frame 16 may cooperate with a frame cover plate 30 which has one portion 32 secured to frame flange 22 and a cover portion 34 which shields a portion of the closure member anchorage assembly. This cover plate 30 which is optional serves to resist undesired entry of dirt into the frame interior and also is aesthetically more desirable.

Figure 3A:
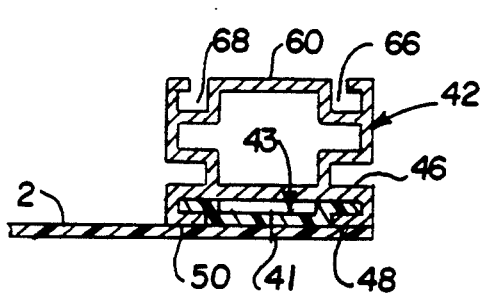
FIG. 3A shows a cross-sectional illustration of a modified form of securement between the closure member and FIG. 3B is similar to FIG. 3A, but shows a system wherein two tape means are employed.

As shown in FIG. 2 and 3A, the closure member 2 has tracking means 40 secured thereto by fastening means 41 positioned generally in the middle thereof. In this form the tracking means has a centrally located depressed panel 43 which minimizes contact between stitching 41 and guide means 42 to thereby shield the stitching 41 and reduce friction. Fastening means may be any desired form of fastening means including sewing or mechanical fasteners such as rivets, double faced pressure sensitive tape or staples, for example, which will provide the securement desired while permitting the door to be stored on reel 4. The closure assembly 2 is provided with guide means 42 which is, preferably, substantially rigid and may conveniently be an aluminum extrusion.

Figure 3B:
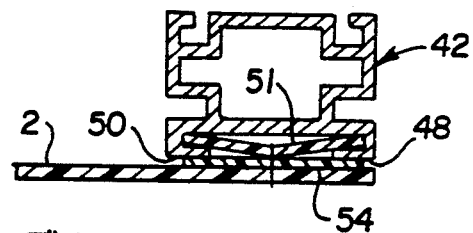

With reference to FIG. 3B, it is noted that She closure member 2 has tracking means which consist of a first tape 51 and a second tape 54 both of which are secured on the same side of the closure member 2. The free portions of the two tapes 51, 54 are received between the two re-entrant flanges 48, 50. This serves to minimize wear of the lateral edges of the closure member 2 and also reduces the frictional forces resisting relative movement between the guide means 42 and the closure member 2.

Referring to FIGS. 2, 3A and 3B, it will be appreciated that the guide means 42 has a front wall 46 which has a pair of re-entrant flanges 48, 50 within which portions of the tracking means 40 are retained by mechanical engagement. It will be appreciated that relative sliding movement of the tracking means 40 with respect to the guide means 42 is permitted, but relative separation of the tracking means 40 from the guide means 42 is resisted. Thus, in moving the closure member between an open position and a closed position, relative sliding movement will be effected.

While the tracking means 40 may be made of any desirable material or be of any desired shape so long as the desired mechanical interengagement may be effected without risk of loss of such engagement and while permitting relative sliding movement, it is preferred that the tracking means be in the form of a tape and, preferably, a substantially rigid plastic tape such as one made of ultrahigh molecular weight polyethylene or vinyl. In this manner, the frictional resistance to relative sliding movement between the guide means 42 and the closure member 2 is reduced, thereby requiring less force to effect opening and closing of the door. Also, the use of such materials is economical and the tape configuration facilitates rolling the closure member 2 on the reel 4 without excessive build-up of material in the tape area.

Referring still to FIG. 2, it will be appreciated that the frame cover portion 34 is spaced from the closure member 2 so as to establish a gap 52. Similarly, the rear wall 60 of the guide means 42 is spaced from rear portion 19 of framing member 16 so as to provide a gap 62. While the framing member cover plate 30 provides a certain degree of shielding, nevertheless, there is created the potential for the undesired passage of air from one side of the door to the other. Such air, for example, may be of a different temperature, or may contain potentially hazardous constituents and be environmentally undesirable. It is preferred, therefore, with reference to FIGS. 2, 3A and 3B to provide a pair of rearwardly facing gasket receiving openings 66, 68 on the portion of the guide means 42 which faces the rear portion 19 of the framing member 16. A single such gasket 70 is shown received mechanically by snap fitting into recess 66 and in resiliently maintained contact with the inner surface of base wall 19 of framing member 16. Similarly, a second gasket may be provided in recess 68. This gasket member may be made of any suitable resilient material such as neoprene, rubber or plastic, for example. It serves to maintain a seal between one side of the door and the other so as to resist undesired passage of air therethrough. It will be appreciated that the sealing member 70 is, preferably, longitudinally continuous and coextensive with the guide means 42 so as to provide for continuous sealing. Guide means which may be identical to guide means 42 are movably secured to frame 18 for relative movement with respect thereto.

Figure 4:
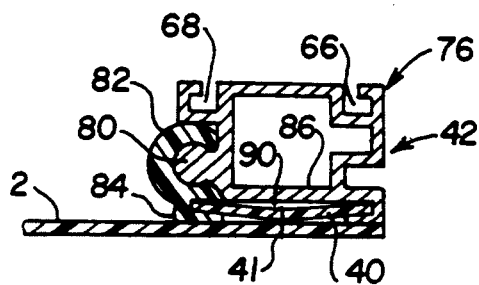
FIG. 4 is a cross-sectional illustration showing a further modified form of closure member securement of the invention.

Referring to FIG. 4, a further embodiment of the invention will be considered. In this embodiment, the closure member 2 is secured to the tape 40 by fastener means 41. The guide means 76 has been modified. While retaining gasket receiving recesses 66, 68, one portion of the extrusion has been modified so as to provide a generally cylindrical rib 80 to which is secured a generally hook-shaped member 82 which is in general surface-to-surface surrounding relationship with respect to rib 80. The hook-shaped member 82 has a flange 84 which cooperates with wall 86 of the guide means 76 to define a portion of a tape receiving recess 90. In this embodiment were an impact load to be applied to the closure member 2, the hook shaped member 82 would fracture or release so as to once again avoid damage to the main structural members, or the building, or to the closure. It will be appreciated that the hook-shaped member 82 will be of generally uniform cross-sectional configuration throughout its length and be substantially coextensive with the guide means 76.

Referring once again to FIGS. 1 and 2, it will be appreciated that were a vehicle, such as a forklift drive for example, to accidentally hit the closure member 2, no structural damage will be done to portions of the building, and it is highly unlikely that any structural damage will be done to the guide means 42 or the framing means 16. What is most likely to occur, is either the tape 40 will disengage from the closure 2 as a result of fracture of the fastening means 41, or the tape 40 will be pulled out of recess 74 defined in the guide means 42.

More specifically, the closure member will tend to deflect away from the direction from which the impact force is imposed thereby causing tape 40 to apply a substantial force on hook-shaped member 82. This force will cause member 82 to disengage from rib 80. This disengagement of member 82 forces tape 40, which is secured to closure member 2, away from the guide means 76. In order to put the door back in operation, the closure member is placed in the open position and member 82 is snapped back into engagement with rib 89. Tape 40 is inserted into guide means 76 and the door is ready for operation.

Figure 5:
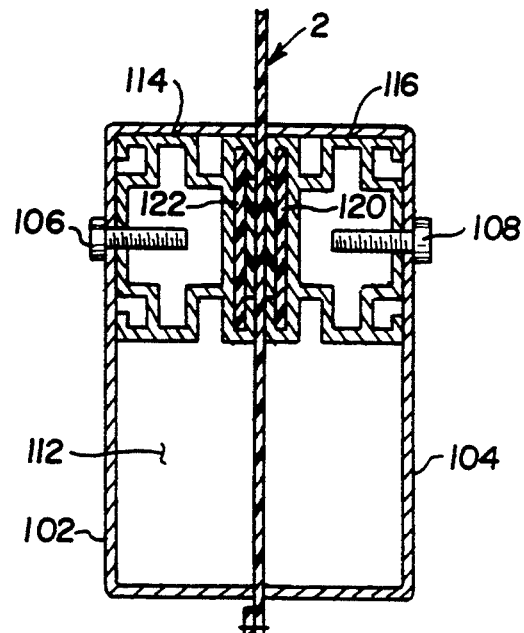
FIG. 5 is a cross-sectional illustration showing a portion of the base of the closure member taken through 5—5 of FIG. 1.

Referring to FIGS. 1 and 5, there is shown a cross-section of the base portion of the closure assembly. The closure member 2 terminates in a loop portion 92 which is adapted to be in contact with the underlying floor to facilitate providing a seal therewith. A transverse stiffener member 100, which in the form shown, consists of two generally identical channel-shaped portions 102, 104 cooperate to define a recess 112 through which the closure member 2 passes. Confined within the recess 112 of the stiffener 100 are a pair of guide means 114, 116 which receive respectively tracking means 120, 122 The assembly is secured by means of bolts 106, 108 which screw into guide means 114, 116. It will be appreciated that the assembly is retained by the tracking means 120, 122 being received within the respective guide means 114, 116 which, in turn, are respectively secured to the channel shaped portions 102, 104 to thereby establish unitary action in the stiffener member 100. This transverse bar 100 not only facilitates engagement of the lower portion of the door, but stiffens the same. In addition, the influence of gravity on the weight of this stiffener facilitates efficient operation of the door. When the bolts 106, 108 have been tightened, the clamping engagement with the closure member 2 will serve to secure the stiffener bar 100 to the lower portion of the closure member. This connection allows the closure member 2 to expand and contract. It also distributes the weight of the stiffener member 100 evenly across the closure.

Figure 6:
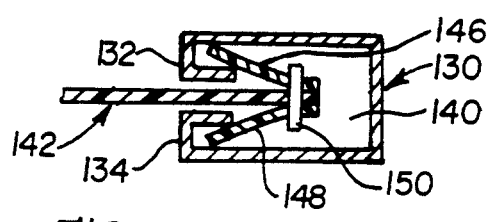
FIG. 6 is a cross-sectional view of a modified form of interengagement between the closure member and the guide means.

Referring to FIG. 6, there is shown a modified form of the invention wherein the guide means 130 has a pair of re-entrant flanges 132, 134 which cooperate with the remainder of the guide means 130 to define recess 140. The closure member 142 has a pair of tracking means 146, 148 secured thereto by suitable fastener means 150 which may take the form of sewing, double faced tape, rivets, or bolting, for example. In this embodiment of the invention, it will be appreciated that tracking means 146 is received within the hollow portion of re-entrant flange 132 and tracking means 148 is received within the hollow portion of re-entrant flange 134 so as to provide a different form of mechanical interengagement between the closure member 142 and the guide means 130 from the embodiment of FIGS. 1 through 4 while facilitating relative sliding movement therebetween. In this embodiment, the tracking means 146, 148 are on opposite sides of the closure member 142.

Figure 12:
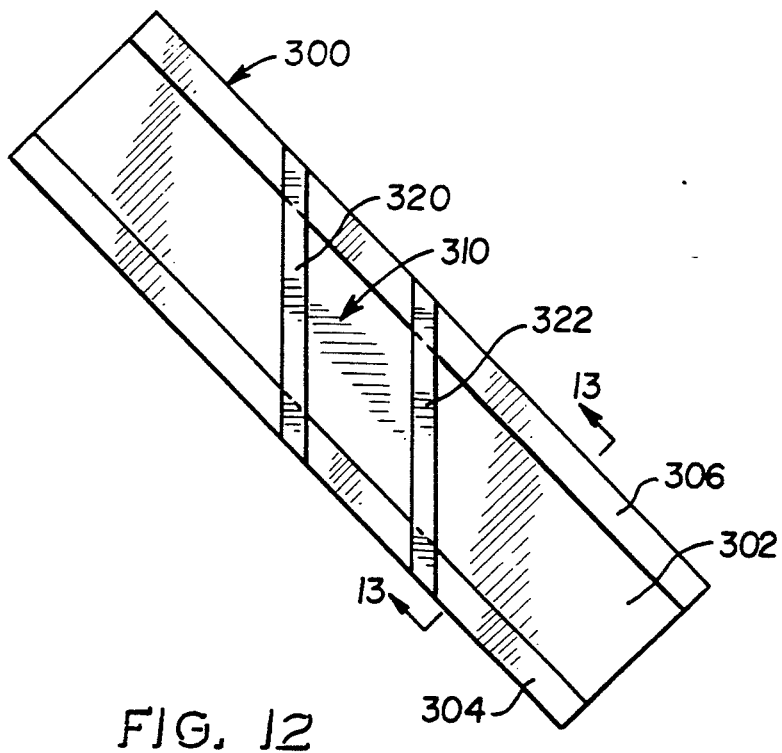
FIG. 12 is a front elevational view of a guide channel and its associated shoe.
Figure 13:
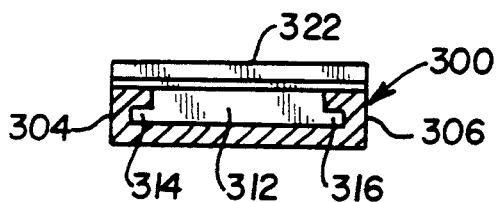
FIG. 13 is a cross-sectional illustration of the guide channel and shoe of FIG. 12 taken through 13—13.
Figure 15:
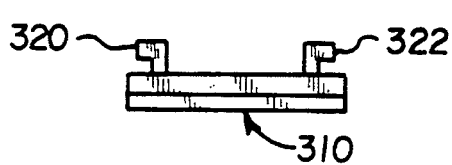
FIG. 15 is a front elevational view of the shoe
Figure 16:
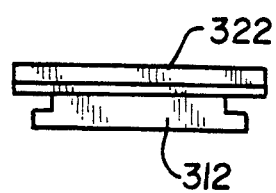
FIG. 16 is a right side elevational view of the shoe.

In this embodiment, a suitable shoe construction such as that shown in FIGS. 15 and 16 is secured to the upper surface of guide means 130 and engages channel guides as is shown in FIGS. 12 and 13. One suitable means for securing the shoe to guide means 130 is to provide an integrally formed depending leg which may be secured to the wall of guide means 130 opposite the opening through which closure member 142 extends. The depending leg may have a width less than the shoe width as shown proportionally in FIG. 16. Securement may be effected by any suitable means such as mechanical fasteners, or if the shoe is composed of metal, welding, for example.

Figure 7:
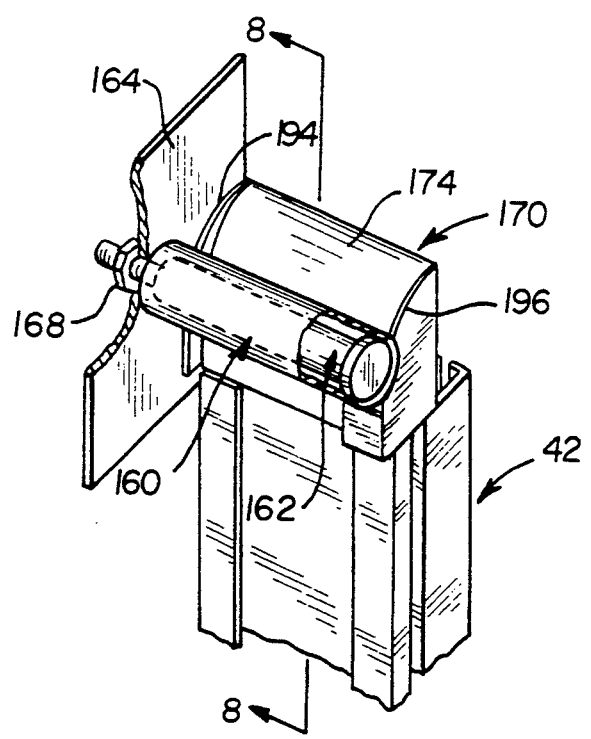
FIG. 7 and 8 are, respectively, a fragmentary perspective view showing a portion of the upper guide member of the present invention and cross-sectional view of the same taken through 8—8 of FIG. 7.
Figure 8:
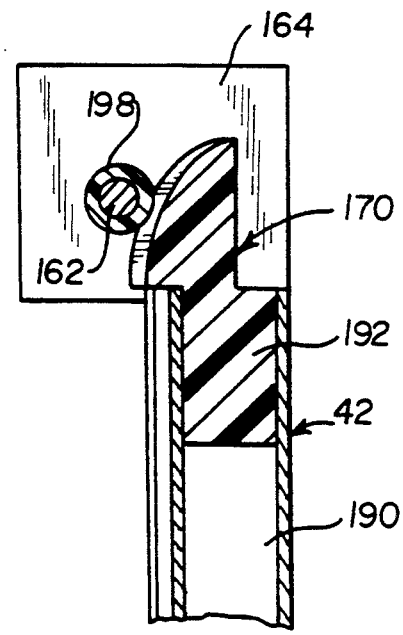

FIGS. 7 and 8 show an upper portion of the guide means 42 which serve to facilitate efficient movement of the closure member onto and off of the reel 4. A freely rotatable roller member 160 is mounted for axial rotation about bolt 162 which is anchored to structural member 164 by nut 168 which is threadedly secured to bolt 164. The cap member 170 is adapted to be mechanically received within central recess 190 (FIGS. 2 and 8) of the guide means 42. The cap member 170 serves as a keeper means to prevent the tracking means from coming completely out of the guide means 42. It will be appreciated that the lower portion 192 of cap member 170 is in intimate contact within recess 190 so as to provide effective mechanical securement thereof. The cap member 170 also has a pair of upstanding sidewalls 194, 196 adjacent lateral edges thereof. As the closure member 2 unwraps from the reel or barrel 4, the closure member 2 is forced against recess surface 174 of cap member 170 by roller 160. This action urges the tracking means (not shown in this view) to enter the guide means 42 and in the double tape embodiment to have a portion outside the guide means as desired.

Referring once again to FIG. 1, it will be appreciated that the frame members 16, 18 have, respectively, a plurality of upwardly and outwardly extending guide channels 200, 202, 204, 206, 210, 212, 214, 216. In the form illustrated, these channels, preferably, are at an angle of about 22½ to 55 degrees and most preferably, 45 degrees with the vertical It is preferred that these channels be spaced vertically about 1 to 3½ feet from each other These guide channels preferably have a length of about 1½ to 12 inches. These facilitate maintaining the desired transverse tension on the closure member in a manner which will be described hereinafter. These channels are fixedly secured to the frame members 16, 18 and serve as the means for mechanically connecting the guide means 42 in a relatively movable relationship with the frame members 16, 18.

Referring to FIG. 9 there is shown the right side frame member 16 which has a guide means 42. A single guide channel 200 is shown which is secured to frame base wall 19 by mechanical fasteners 230, 232, 234 which may be nuts and bolts, for example, or any other suitable means. It is preferred that the guide channels 200 be made of plastic and have re-entrant flanges for receipt of the shoe. (not shown) which is secured to the guide means 42. A compression coil spring 231 is shown disposed in the end of the guide means 42 within the central recess 190 (FIG. 8) of the guide means 42 in a compressed position. Securing the upper end of the spring 231 against undesired upward movement is a transversely oriented retainer pin 239 which is secured within openings of guide means 42. At the lower end is a piston 240 which terminates in a roller base 242. When the guide means 42 is installed, the roller engages the lower flange 250 of frame 16 and urges the piston 240 upwardly, thereby compressing the spring 231. If desired the lower flange member, rather than being formed as an integral part of frame 16, may be formed as a separate element having a lower surface on which the roller base 242, which may be secured by a roll pin, will contact with upwardly projecting portions which may be mechanically secured to flanges 20, 22 (FIG. 2) by any suitable means such as nuts and bolts, for example. This compression serves to provide a longitudinal upward force which imposes a vectorial outward and upward force on the shoes disposed within the guide channels such as 200, thereby moving the guide channel 42 to the right in FIG. 9 and enhancing the lateral tension on the closure member 2. A similar assembly for outwardly biasing the other guide means associated with frame member 18 is also provided.

It will be appreciated that alternate means for biasing the closure member may also be employed. In the embodiment shown in FIG. 10, the assembly is essentially as in the embodiment of FIG. 9, except in lieu of using a shoe within the various guide channels, such as guide channel 202, a linkage arm 260 is pivotally secured to the frame rear portion 19 through pivot 262 and is also pivotally secured to the guide means 42 by pivot 264 This arrangement permits rotation of the link 260 in a clockwise direction from the position shown to thereby apply force no the guide means 42 moving it to the right and increasing the lateral tension on the closure member. The reverse direction of movement of the link would occur for the other frame.

In the embodiment of FIG. 11, a disk 270 is secured to guide means 42 by means of pivot pin 274. Disk 270 is also secured to frame base wall 19 by pivot pin 290. Pin 274 may be considered as projecting out of the page and pin 290 projecting down into the page. When upward force is applied to guide means 42, disk 270 rotates guide means 42 upwardly and outwardly to increase the tension in closure member 2.

Figure 14:
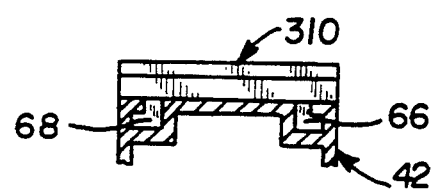
FIG. 14 is a partial cross-sectional illustration of the guide channel and shoe engaged with guide means.

Referring now in greater detail to FIGS. 12 through 14 there is shown a guide channel 300 which has a base portion 302 and a pair of upstanding flanges 304, 306 which terminate in re-entrant portions defining a pair of recesses A shoe member 310 has a base portion 312 with a pair of lateral projections 314, 316 which are received within re-entrant flanges 304, 306, respectively. In this manner relative sliding movement between the guide channel 300 and the shoe member 310 is permitted while resisting separation of the two.

The shoe 310 has a pair of upstanding ribs 320, 322, may be received within the rearwardly open recesses 66 and 68 (FIG. 3A) of the guide means 42 and are secured in place by any suitable means. This interengagement permits relative sliding movement therebetween. It will be appreciated that in installing the gasket means 70 (FIG. 2) gaps will appear where the shoes 310 are inserted in the guide channels 300.

The ribs 320, 322 are shown in greater detail in FIGS. 15 and 16. It will be noted in FIG. 15 that the ribs 320, 322 are generally L-shaped in order to facilitate mechanical interengagement with recesses 66, 68 of guide means 42 to provide resistance to inadvertent separation therebetween.

Figure 17:
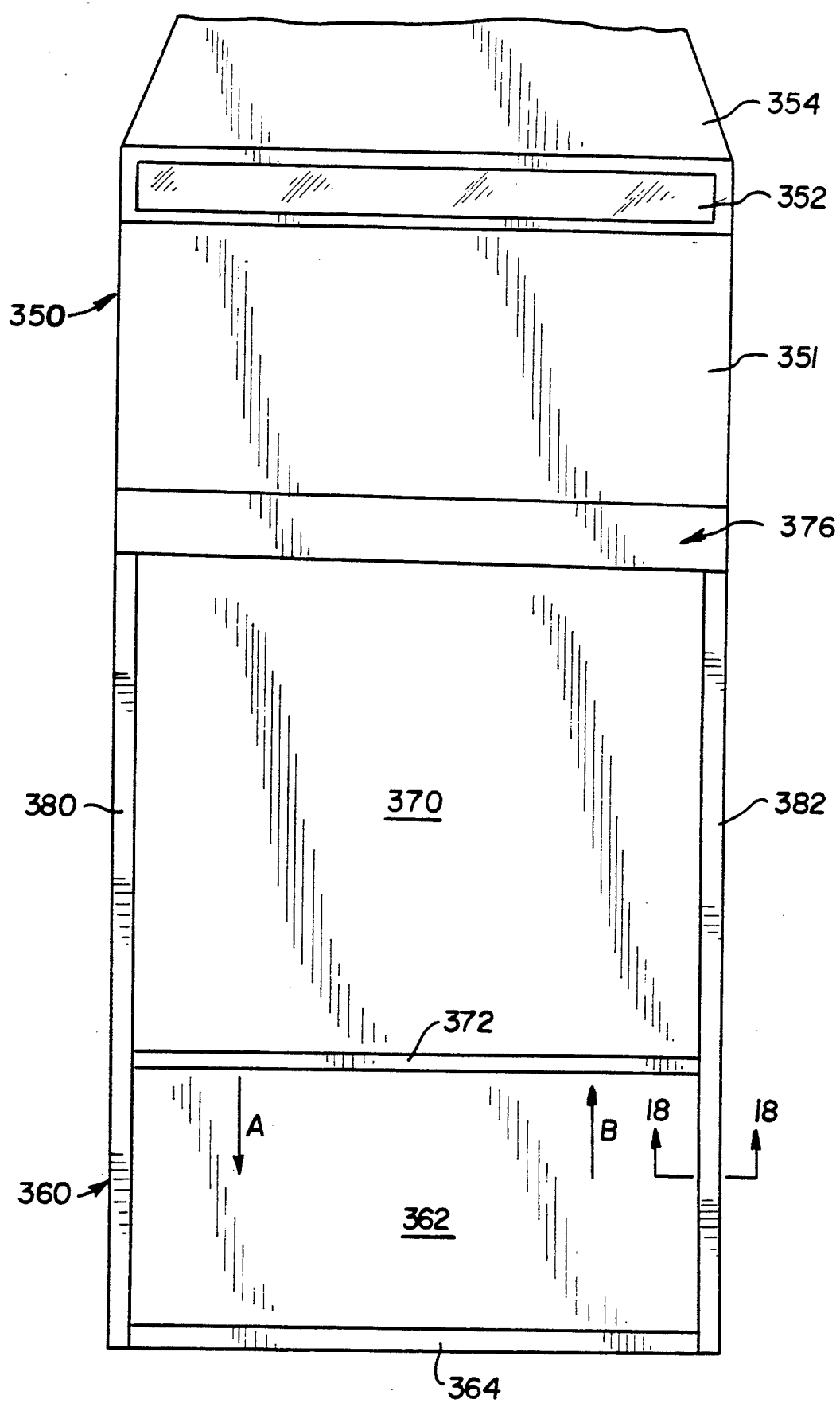
FIG. 17 is a schematic top plan view of the pickup truck bed employing another embodiment of the invention.

Referring now to FIG. 17, there is shown schematically in plan, a pickup truck which has a passenger cab portion 350, a windshield 352, a hood 354 and a truck bed 360. The truck bed has a floor 362 which forms the base of the upwardly opened bed recess defined by floor 362, truck rear gate 364, a pair of generally parallel longitudinal sidewalls (not shown) and the rear portion of the cab 350 (not shown).

The similarity between the closure assembly employed in connection with this truck bed embodiment and those discussed previously hereinbefore will be apparent. The closure member 370 may consist of a waterproof member and may have a rearward portion secured to a substantially rigid transverse frame member 372 which may be engaged manually in order to reciprocate the cover and the direction indicated by arrow A so as to close the truck bed by moving the frame member 372 to rear gate 364 or moving the same in the direction indicated by arrow B to open the truck bed and permit access thereto. At the forward end of the closure member 370 is a hood 376 which preferably is spring biased so as to facilitate placing the closure 370 in the open or retracted position. If desired, weatherstripping may be placed on the underside of the hood 376 so as to resist entry of foreign material which might be on the upper surface of the closure member 370 as the reel takes up the closure member 370.

Figure 18:
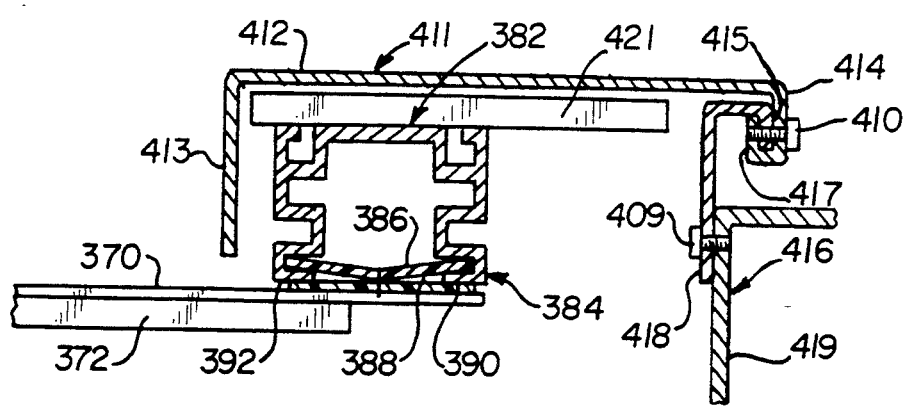
FIG. 18 is cross-sectional illustration taken through 18—18 of FIG. 17 showing a form of guide means of the present invention.

With reference to FIGS. 17 and 18, it will be appreciated that a pair of elongated generally parallel guide means 380, 382 as shown in FIG. 18 which may be generally similar to those shown in FIGS. 3A and 3B are employed. The closure member 370 has tracking means which in the form illustrated are a pair of superimposed tapes 386, 388 which receive re-entrant flanges 390, 392 of the guide means therebetween. As was true in connection with the prior embodiments, this form of interengagement which will be provided on both sides of the truck bed serves to facilitate relative longitudinal sliding movement of the closure 370 between an open and closed position.

As shown in FIG. 18, a cover plate 411 has a body portion 412 and a pair of depending flanges 413, 414 and has an inverted channel shape. Cover plate 411 is in overlying spaced relationship with respect to guide means 382. Flange 414 terminates in a re-entrant flange 417 which defines an upwardly open recess which recess receives downwardly projecting flange 415 of connector 416. Connector 416 has a lower portion 418 which is secured to truck bed sidewall 419 which terminates an outwardly directed flange by any desired means, such as bolt 409, for example. A series of spaced screws 410 serve to establish the desired initial set up positions of flanges 415, 417. This cover plate 411 serves to resist entry of foreign matter into the guide means 382.

In the preferred embodiment, tensioning of the closure material 370 and retention of guide means 382 (and the corresponding guide means on the other side which is not shown) will be effected by tensioning means such as is shown in FIGS. 1 and 9 through 11 cooperating with guide channels such as 200 through 216 (even numbers only) which will be oriented angularly outwardly and forwardly (i.e., in the direction in which the truck is facing and laterally outwardly) One guide channel is shown as element 421 in FIG. 18.

In this manner, the guide means are shielded from exposure to dirt, rain, snow and other materials which might potentially interfere with efficient functioning of the truck bed closure means.

Figure 19:
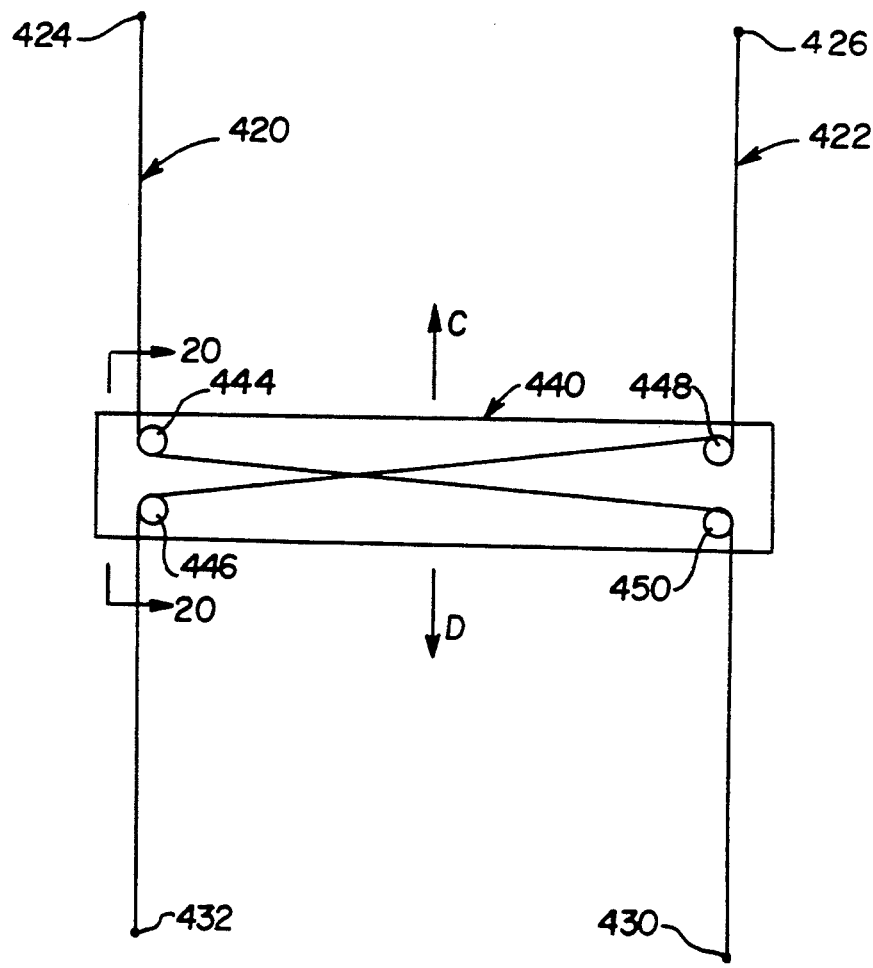
FIG. 19 is a schematic illustration of a form of stabilizer assembly employed in the truck embodiment of the invention.
Figure 20:
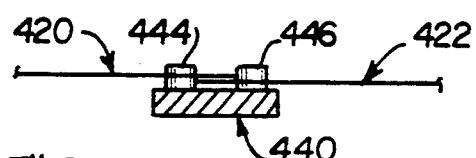
FIG. 20 is a cross-sectional illustration of a portion of the stabilizer assembly taken through 20—20 of FIG. 19.

It will be appreciated that as the closure member 370 moves in a horizontal plane, unlike the embodiment of FIG. 1, there is no opportunity through the use of a stiffener bar 100, 372 to take advantage of the influence of gravity in providing for relative aligned movement of the respective sides of the closure member. A preferred approach to maintaining side to side stability in the closure member 370 is illustrated in FIG. 19.

A pair of cable members 420, 422 have a first end 424, 426 respectively, secured generally underlying frame members 380, 382 and fixedly secured toward the front portion of the truck bed. Cable 420 crosses over angularly transversely and has a second end 430 fixedly secured toward the rear of the truck bed. It may be secured to the truck bed sidewalls. Similarly, cable 422 crosses over transversely and has a second end 432 adjacent to the rear portion of the truck. Stabilizer member 440 is elongated and disposed generally transversely with respect to the truck bed. It may be secured to the truck bed sidewalls. It has four upstanding post members 444, 446, 448 and 450 The first cable 420, passes rearwardly of post 444 and against the forward side of post 450. Cable 422 passes rearwardly of post 448 and is in contact with the forward portion of 446.

It will be appreciated that with the cables in fixed position, movement of the stabilizer 440 in the directions shown by arrows C or D will result in the longitudinal axis of the stabilizer member 440 being oriented substantially perpendicularly to the longitudinal axis of the truck bed, thereby facilitating uniform movement of the closure member rearwardly and forwardly.

It will be appreciated that as truck sidewalls are not generally made with great precision, the screws 410 may be employed to adjust the relative positioning of the framing members 380 and 382 transversely so as to provide the desired initial transverse tension in the closure member 370.

It will be appreciated that closure 170 may be opened or closed manually directly or with a mechanical assist such as a crank or a motor.

Figure 21:
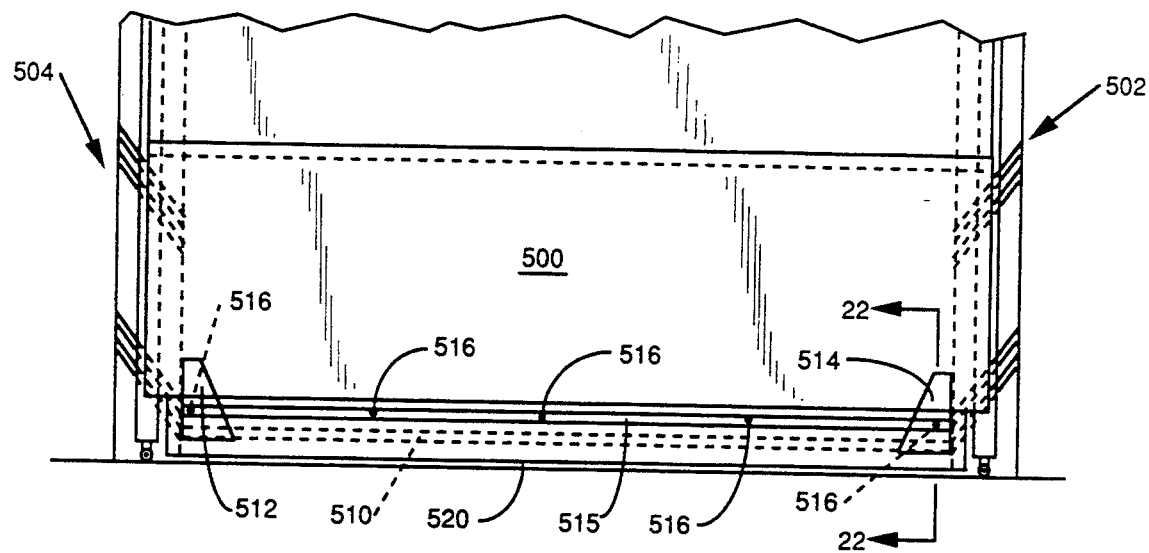
FIG. 21 is a partial front elevational view of a garage or industrial door generally similar to FIG. 1 except showing a modified form of the invention.

Referring now to FIG. 21, a further embodiment of the invention will be considered. In this embodiment, a closure 500 may be supported between two frames 502, 504 in the manner to be described hereinafter or the manner previously disclosed herein.

Figure 22:
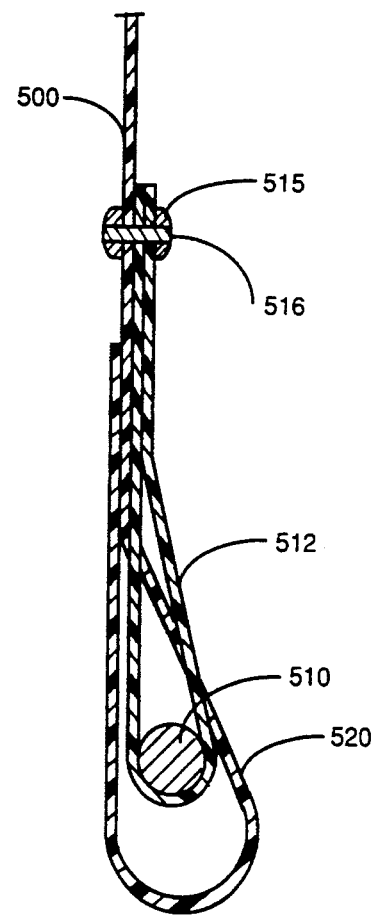
FIG. 22 is a cross-sectional illustration taken through 22—22 of FIG. 21 showing the lower portion of the closure.
Figure 23:
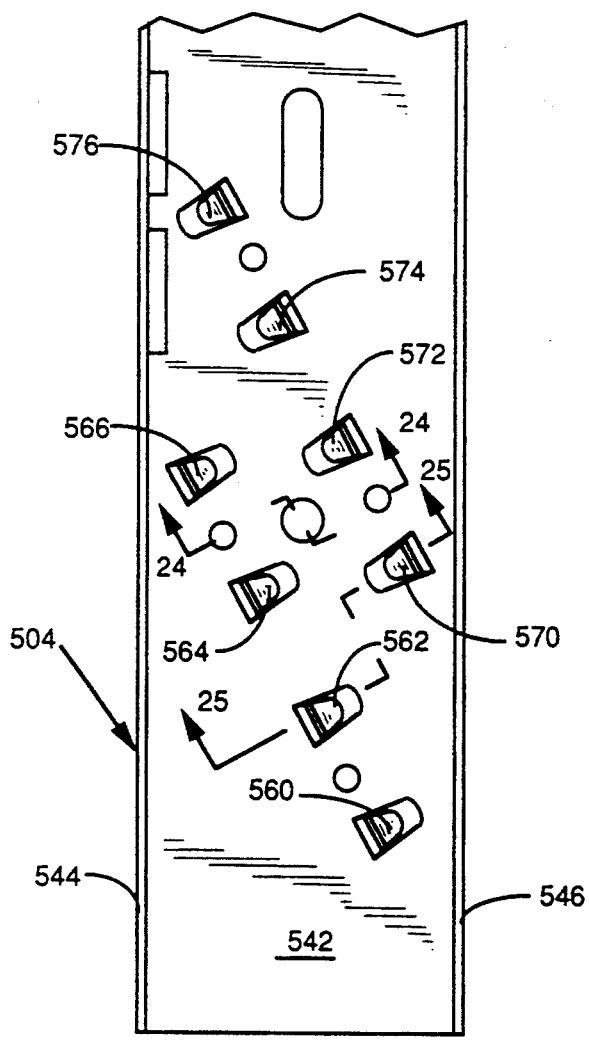
FIG. 23 is a partial elevational view showing a frame member with modified means for securing guide channels thereto.
Figure 24:
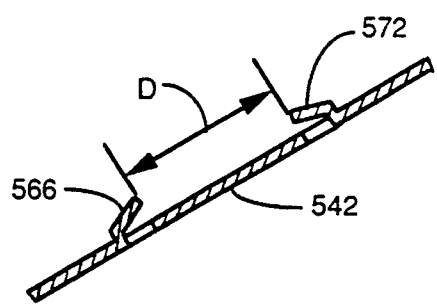
FIG. 24 is a cross-sectional illustration showing a portion of the guide channel retaining means taken through 24-24 of FIG. 23.
Figure 25:
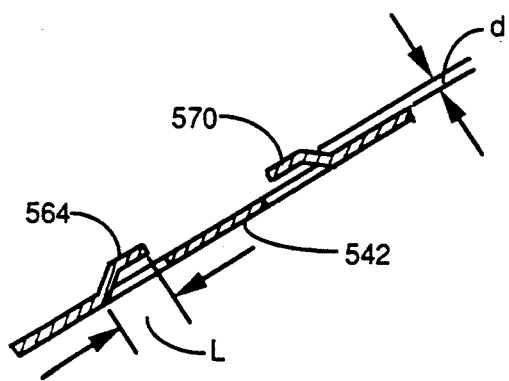
FIG. 25 is a cross-sectional illustration showing a cross-sectional view of the guide channel securing means of FIG. 23 taken through 25—25.

Referring to FIGS. 21 and 22 a transversely positioned bottom weight 510 which in the form shown is a generally cylindrical steel bar which extends substantially across the entire closure and is supported at its ends within stirrups 512, 514. The stirrups 512, 514 may be made of the same material as the closure 500 which may be vinyl coated polyester, for example. They have their upper ends secured to a lower portion of the closure 500 and the tracking means such as sewing or riveting by any suitable means. Attachment bar 515 extends across the width of the closure 500 and is secured in place by a plurality of rivets 516. It will be appreciated that the attachment bar 515 extends substantially entirely across the lower portion of the closure. Underlying the bottom weight 510 is a tubular compressible seal portion 520 and may be an integral part of the closure 500. In normal use with the closure 500, in closed position, the bottom of loop 520 will touch the floor to provide a seal. If desired, suitable seal enhancing means such as an elongated cylindrical foam plastic member may be provided within loop 520.

It will be appreciated that by means of this assembly, in closed position, the lower portion of the closure 500 is stiffened by bar 515 and is in sealing engagement with the underlying floor. The seal resists undesired passage of air thereunder. Also, the bottom bar 510 serves to facilitate closing of the closure by urging it downward under the influence of gravity.

As was shown in FIG. 1 and FIGS. 12 through 16, in a first embodiment of the invention, a plurality of guide channels 200, 202, 204, 206, 210, 212, 214, 216 are secured to the frames 16, 18 and are disposed angularly, upwardly and outwardly. The guide means are movably attached thereto by means of the shoes 310. In the first embodiment of the invention, it was suggested that the guide channels could be secured to the frame 16, 18, by any suitable means such as separate mechanical fasteners. In the present embodiment of the invention as shown in FIGS. 23 through 26, it is contemplated that the frame member 504 will have a base wall 542 and a pair of generally parallel projecting sidewalls 544, 546 to provide a generally channel shape. A first group of tabs 560, 562, 564, 566 extend in a first row generally angularly, upwardly and outwardly with the tab opening facing generally inwardly and upwardly. A second group of tabs 570, 572, 574, 576 are in a row which also extends generally upwardly and outwardly and is generally parallel to the first row, but have their tab openings facing generally outwardly and downwardly. Also, the tabs in one row are generally staggered with respect to the tabs in the adjacent row The nearest points of the tabs' openings are preferably spaced from each other, a distance D, which may be about 1.00 to 1.50 inches. The tabs may project upwardly a distance d measured from the upper surface of base 542 to the lower surface of the tab about 0.07 to 0.09 inch and have a tab length L of about 0.175 to 0.275 inch.

Figure 26:
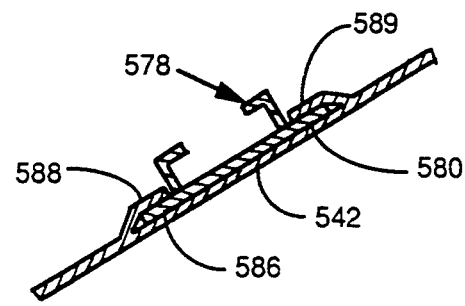
FIG. 26 is a cross-sectional illustration showing a guide channel secured by the means of FIG. 23.

As shown in FIG. 26, the elongated guide channel 578 has a first lateral portion 580 in underlying mechanical interengagement with tab 589 and a second lateral portion 586 in underlying mechanical interengagement with respect to tab 588.

It will be appreciated that the lateral portions 580, 586 and 588 will be generally continuous In effecting the assembly the tabs 588, 589 will generally be projecting upwardly with the guide channel being physically positioned therebetween with the downward bending of the tabs being effected thereafter to achieve the relative positions shown in FIG. 26. In the preferred embodiments, the guide channel ends will respectively be in surface-to-surface contact with the inner surfaces of walls 544, 546 thereby firmly securing the same in position.

Figure 27:
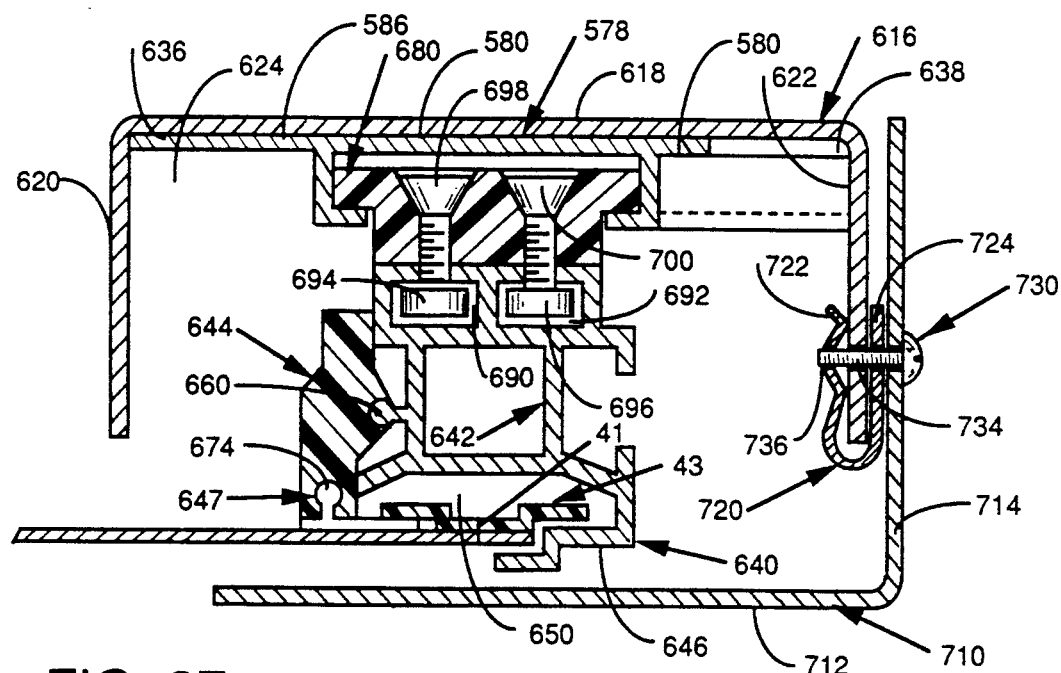
FIG. 27 is a cross-sectional Illustration showing a portion oil the closure retaining assembly.
Figure 28:
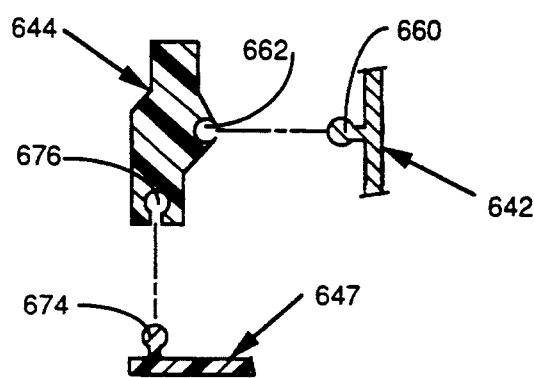
FIG. 28 is a partial exploded view showing portions of an embodiment of the guide means.

Referring more specifically to FIGS. 27 and 28, several additional features of the invention will be considered. The frame member 616 has a base wall 618 and a pair of generally parallel lateral walls 620, 622 which cooperate to define a channel having a recess 624. Disposed within the recess and secured to base wall 616 by any desired means such as the tab means illustrated in FIGS. 23-26 is a guide channel 578 which has its base 580 in surface-to-surface contact with base 618 of framing member 616. A pair of lateral extensions 580, 586 are engaged by the tabs. One end 636 of the upwardly and outwardly disposed guide channel 578 is in contact with the interior of wall 620 and the other end 638 is in contact with the interior of wall 622.

The closure member 2 has tracking means 43 secured thereto by suitable fastening means 41 which may take the form of mechanical fasteners or stitching. The guide means 640 consists of three components. An extruded member 642 cooperates with members 644 and 647 to provide a re-entrant flange for receipt of the tracking means 43. (See FIGS. 27 and 28). In this embodiment a forwardly projecting stepped portion 646 of the extrusion 642 cooperates with element 647 to define the recess 650 within which the tracking means 43 are slidingly received. This embodiment is somewhat similar to the embodiment of FIG. 4, but contemplates a multi-piece breakaway portion which may be severed at either of two locations depending upon the direction of application of the force that causes separation A generally cylindrical boss 660 projects from extruded section 642 and is received within recess 662 of element 644 in snapfit engagement. Element 647 has a generally cylindrical member 674 which is adapted to be received in recess 676 of element 644 in snapfit relationship. It will be appreciated that should a shock load of sufficient magnitude be applied to closure 2 when it is in the closed or partially closed position, the interconnection between boss 660 and recess 662 or the interconnection between element 674 and recess 676, or both, may be caused to separate without fracturing portions of the closure 2, the tracking means 43, or other components of guide means 640. Ready reassembly may then be effected. As the opening of recess 662 is angularly offset from the direction of opening of recess 676 and faces in a direction substantially perpendicular thereto, it will be appreciated that depending upon the direction of the applied force, one of the two connections will be more likely to release than the other.

In the preferred embodiment, elements 644 and 647 will be elongated and substantially coextensive with extrusion 642 and be made of a substantially rigid resinous plastic. A preferred material for these two elements is ultrahigh molecular weight polyethylene. Extrusion 642 is preferably made of aluminum. The tracking means 43 is preferably made of ultrahigh molecular weight polyethylene.

Referring to FIG. 27, a shoe member 680 which may be of the general type shown in FIGS. 12 through 16 is slidingly secured to both channel guide 578 and extruded member 640 so as to facilitate the type of closure tensioning disclosed hereinbefore. The shoe member 680 may be made of polycarbonate. In the form illustrated, the guide member 640 has a pair of recesses 690, 692 which are rearwardly open and receive anchoring portions 694, 696 of mechanical fastener 698, 700 to thereby resist separation of the shoe 680 from the recesses 690, 692. In the form illustrated, nuts 694, 696 are secured respectively to bolt 698, 700. A pair of such fasteners or more than one pair may be used to effect securement of the shoe 680 in the manner described.

As shown in FIG. 27, a coverplate 710 is generally L-shaped and has a forwardly facing leg 712 and a rearwardly projecting leg 714 In the form illustrated the cover 710 is secured to wall 622 by having aligned apertures therein and providing a metal clip member 720 which has a leg 722 disposed on the interior of wall 622 and a leg 724 disposed in between wall 714 and wall 622. Each leg of this clip member 720 has an aperture aligned with the openings in walls 622 and 714. A bolt 730 has a threaded shank 734 which passes through the openings and threads into inner leg 722 of clip member 720 at opening 736 to thereby resist undesired separation. A plurality of such locking devices vertically spaced may be provided.

Figure 29:
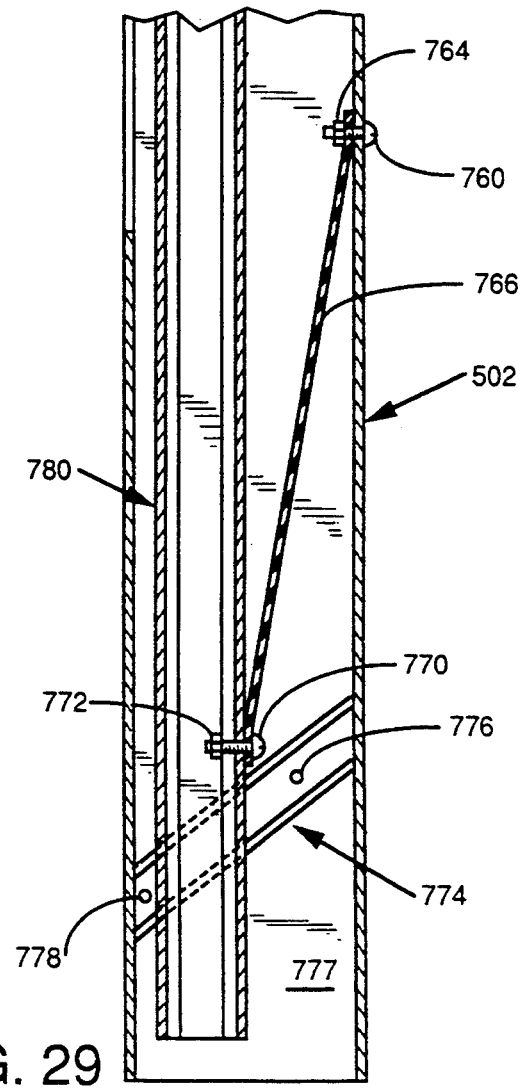
FIG. 29 is a cross-sectional illustration of a modified form of biasing means of the present invention.

Referring to FIG. 29, another embodiment of a closure tensioning means will be considered. A framing member 502 has guide means 780 movably connected thereto through a shoe (not shown in this view) which is slidingly received with channel guide 774. Channel guide 774 is oriented angularly upwardly and outwardly and is in the form shown secured to base 777 of framing member 502 by rivets 776, 778. An elongated tensioning member 766 which is preferably a resilient member and is most preferably composed of rubber has its upper end secured to outer wall of framing member 502 by any suitable means such as bolt 760 and associated nut 764. The resilient member 766 has its lower end secured to guide means 780 by bolt 770 and associated nut 772. The resilient member 766 may have a generally rectangular cross-sectional configuration with a thickness of about 0.25 inch and a width of about 0.75 inch. The resilient member 766 is oriented angularly upwardly and outwardly, but at a smaller angle with respect to the vertical than said channel guide 774. As the closure member is moved to a closed position, tension on the elastic member 766 will be increased thereby causing it to urge guide means 780 to the right in FIG. 29 with the shoe moving upwardly and to the right within channel guide 774. This increases tension on the closure member. A similar tensioning system may be employed on the other framing member.

It will be appreciated that the tensioning member 766 also will permit movement of the guide means 780 inwardly responsive to lateral contraction of the closure member 500.

It will be appreciated that some of the features of the present embodiment may be employed with features of the other embodiments disclosed herein depending upon the objectives with respect to a particular installation.

It will be appreciated, therefore, that the present invention has provided an efficient and economical means for effectively establishing sealed closure of a structural opening while resisting undesired damage were an accident to occur such as vehicular impact with the door in closed position.

It will be appreciated that while in the form illustrated, the closure member is a door composed of flexible material which is adapted to be stored on a reel when the doorway is opened, the invention is not so limited. Rigid doors of generally planar configuration which move directly vertically or directly horizontally into storage areas may also employ the invention in essentially the same manner, i.e., by having tracking means connecting the door's lateral edges with guide means which are relatively movable with respect to frame means.

While for purposes of illustration, reference has been made to a reel-type overhead industrial or garage door and pickup truck bodies, it will be appreciated that the invention is not so limited, but rather is usable with a wide variety of types of closure members. For example, it may be used with other types of doors with windows, with swimming pool covers, and awnings.

While certain specific embodiments of the invention have been disclosed for purposes of illustration, it will be evident to those skilled in the art that numerous variations of the details may be made without departing from the Invention as defined in the appended claims.

I claim:

1. A closure assembly for covering an opening comprising
   a generally rectangular closure member of a size which at least substantially covers said opening,
   said closure member having affixed thereto a pair of tracking means disposed generally adjacent opposite edges of said closure member and along substantially the full length of each said edge,
   a pair of spaced elongated guide means disposed generally adjacent opposite sides of said opening,
   said guide means each having a pair of generally re-entrant flanges defining a tracking means receiving recess, whereby one of said tracking means of said closure member is received within said tracking means receiving recess and secured to each said guide means while permitting relative sliding movement therebetween for moving said closure member between an open position and a closed position along said guide means, and
   said guide means having a removable portion thereof at least partially providing one of said re-entrant flanges being removably secured at a first connection to a second portion of said guide means.

2. The closure assembly of claim 1 including
   said second portion of said guide means being a connector portion which is removably secured to a third portion of said guide means at a second connection.

3. The closure assembly of claim 2 including
   said first connection being established by a first projection disposed on said removable portion being in engagement with a first recess in said connector portion.

4. The closure assembly of claim 3 including
   said first projection being in snap fit engagement with said connector portion recess, and
   said first projection being non-destructively removable from said connector portion upon the application of a force, whereby said joint may be reassembled subsequent to non-destructive removal of said first projection.

5. The closure assembly of claim 4 including
   said second connection being effected by mechanical engagement of a projection of said third portion of said guide means with a second recess in said connector portion.

6. The closure assembly of claim 5 including
   said connector portion first recess facing in a direction angularly offset from the direction faced by said second recess.

7. The closure assembly of claim 6 including
   said first recess facing in a direction which is generally perpendicular to the direction faced by said second recess.

8. The closure assembly of claim 5 including said removable portion and said connector portion being made of a different material than the remainder of said guide means.

9. The closure assembly of claim 5 including
said removable portion having an elongated web portion oriented generally parallel to an adjacent portion of said closure.

10. The closure assembly of claim 5 including
said third portion of guide means providing a portion of a said re-entrant flange which is of generally stepped configuration.

11. The closure assembly of claim 1 including
framing means having a first frame with a first said guide means movably secured thereto and a second frame with a second said guide means movably secured thereto.

12. The closure assembly of claim 11 further comprising
a plurality of guide channels secured to said frames and disposed in spaced relationship to one another,
said guide channels being oriented generally outwardly and upwardly,
shoe means mounted on said guide means, and
said shoe means being slidingly received within said guide channels to alter lateral tension of said closure member responsive to movement of said shoe means within said guide channels.

13. The closure assembly of claim 12 wherein
said movement of said shoe means along said guide channels being effected by biasing means.

14. The closure assembly of claim 13 wherein
said biasing means includes a spring member.

15. The closure assembly of claim 14 wherein
said biasing means has a compression coil spring and piston means which compresses said spring to thereby urge said shoe means angularly outwardly within said guide channels to increase lateral tension on said closure member.

16. The closure assembly of claim 12 including
said framing means having integrally formed tab means, and
said guide means being secured to said framing means by said tab means.

17. The closure assembly of claim 16 including
said tab means having a plurality of tabs disposed within a pair of generally parallel rows.

18. The closure assembly of claim 17 including
said tab rows being oriented generally outwardly and upwardly.

19. The closure assembly of claim 12 including
said guide means having a pair of elongated generally rearwardly open recesses, and
fastener means extending into said recess fixedly securing said shoe means to said guide means.

20. The closure assembly of claim 1 wherein
the engagement between said tracking means and said guide means being such that when a large impact is applied to said closure member it will effect relative separating of said tracking means and said guide means while permitting ready reassembly thereof.

* * * * *

UNITED STATES PATENT AND TRADEMARK OFFICE
CERTIFICATE OF CORRECTION

PATENT NO. : 5,351,742
DATED : October 4, 1994
INVENTOR(S) : Dale LICHY

It is certified that error appears in the above-indentified patent and that said Letters Patent is hereby corrected as shown below:

Column 1, line 40, -- . -- should be inserted after "material".

Column 3, line 12, -- its associated securement means -- should be inserted after "and".

Column 4, line 7, "oil" should be -- of --.

Column 4, line 66, "She" should be -- the --.

Column 8, line 44, -- . -- should be inserted after "264".

Column 8, line 63, -- . -- should be inserted after "recesses".

Column 10, line 11, -- . -- should be inserted after "outwardly)".

UNITED STATES PATENT AND TRADEMARK OFFICE
CERTIFICATE OF CORRECTION

PATENT NO. : 5,351,742
DATED : October 4, 1994
INVENTOR(S) : Dale LICHY

It is certified that error appears in the above-indentified patent and that said Letters Patent is hereby corrected as shown below:

Column 11, line 57, -- . -- should be inserted after "continuous".

Column 12, line 27, -- . -- should be inserted after "separation".

Column 13, line 3, -- . -- should be inserted after "714".

Signed and Sealed this

Twenty-seventh Day of June, 1995

Attest:

BRUCE LEHMAN

*Attesting Officer*              *Commissioner of Patents and Trademarks*